United States Patent [19]

Borchardt

[15] 3,650,693
[45] Mar. 21, 1972

[54] PREPARATION OF FIBROUS TITANIUM DIOXIDE

[72] Inventor: Hans J. Borchardt, Wilmington, Del.

[73] Assignee: E. I. du Pont de Nemours and Company, Wilmington, Del.

[22] Filed: Sept. 24, 1970

[21] Appl. No.: 75,234

[52] U.S. Cl. ............................23/202 R, 23/1 D, 23/202, 23/301, 23/305, 106/300
[51] Int. Cl. ............................................C01g 23/04
[58] Field of Search ..............23/202 R, 202 V, 1 D, 301, 23/305; 106/300

[56] References Cited

UNITED STATES PATENTS

| | | | |
|---|---|---|---|
| 3,012,857 | 12/1961 | Pease | 23/202 R |
| 3,241,928 | 3/1966 | Pease | 23/305 |
| 3,244,481 | 4/1966 | Berry | 23/305 X |

Primary Examiner—Edward Stern
Attorney—Donald A. Hoes

[57] ABSTRACT

A process is described for producing rutile fibers of unusual dimensional uniformity. Titanium trichloride is reacted at 960°–990 c. with humidified oxygen followed by dry oxygen in the presence of molten sodium and potassium chloride mixtures containing preformed titanium dioxide of pigmentary size.

2 Claims, No Drawings

3,650,693

PREPARATION OF FIBROUS TITANIUM DIOXIDE

BACKGROUND OF THE INVENTION

Rutile titanium dioxide in the acicular or fibrous form is valuable as a reinforcing agent for plastics, ceramics and metals because of its morphology and high flexural modulus. It is also useful as a high temperature insulator by virtue of its stability, its low packing density, and its efficiency in scattering infrared radiation, particularly when cross-sectional dimensions are greater than 0.5 micrometers. Acicular rutile of less than 0.5 micrometers, and preferably 0.1–0.3 micrometers in diameter is considered to be of pigmentary size and is valuable as an opacifier for paper and plastics in addition to conferring improved tensile properties to these products.

It is known that acicular rutile of pigmentary dimensions can be prepared by hydrolyzing $TiCl_4$ by heating in aqueous solutions in the presence of rutile-forming nuclei of colloidal dimensions (U.S. Pat. No. 3,329,484) and by calcining a mixture of preformed $TiO_2$, a salt comprising sodium or potassium chloride, and a phosphate (copending application, Ser. No. 655,984—Lewis & Muendel filed June 28, 1967). Processes that have been disclosed for preparing acicular or fibrous rutile of larger than pigmentary dimensions include:

1. Reaction of $TiCl_4$ with a boric oxide and/or alkali metal borate (U.S. Pat. No. 2,980,510).
2. Contracting dry air or oxygen with a molten salt solution of a titanium subhalide (U.S. Pat. No. 3,012,857).
3. Reaction of $TiCl_4$ and anhydrous oxygen or air in a metal halide melt (U.S. Pat. No. 3,030,183).
4. Recrystallization of preformed $TiO_2$ from a molten mixture of alkali metal or alkaline earth metal halides (U.S. Pat. No. 3,241,928).
5. Recrystallizing $TiO_2$ in a melted matrix of cryolite and an alkali metal halide or borate (U.S. Pat. No. 3,244,481), and
6. Calcining alkali-metal deficient alkali metal titanates with mineral acids, $TiCl_4$, $Cl_2$, etc., (U.S. Pat. No. 3,331,660).

The aforementioned processes are generally characterized by exacting conditions, long reaction times and produce low yields of rutile fibers of broad size distributions and acicularity. For such acicular rutile products of larger than pigmentary size, this nonuniformity of size is detrimental to their value as reinforcing agents in plastics, metals and ceramics.

SUMMARY OF THE INVENTION

It has been discovered that acicular or fibrous titanium dioxide particles of predominantly rutile crystal form and of unusual dimensional uniformity can be produced by the reaction at 890°–1,100° C. of $TiCl_3$ dissolved in a molten mixture of NaCl/KCl containing preformed pigmentary titanium dioxide with humidified oxygen, followed by dry oxygen. The process of this invention is therefore distinct from prior art processes such as U.S. Pat. No. 3,012,857 in which the oxidation of a titanium subhalide in a molten salt is carried out with dry oxygen and in the absence of any preformed titanium dioxide.

The present invention more specifically provides a process for preparing titanium dioxide fibers of predominantly rutile crystal form and of unusual dimensional uniformity comprising reaction at 890°–1,100° C. of a 1.5–3 millimeter thick layer of a mixture consisting of, by weight, 2–21 percent pigmentary rutile, 5–25 percent titanium trichloride, and 92–54 percent of sodium chloride/potassium chloride in a 1:3 to 3:1 mole ratio, for 2–15 minutes with humidified oxygen containing water vapor at a partial pressure of 0.10–0.76 atmospheres, said humidified oxygen flowing at 1–25 milliliters per minute per gram of reaction mixture, followed by dry oxygen for 2–25 minutes flowing at 1–10 milliliters per minute per gram of reaction mixture, said gaseous volumes being measured at room temperature and atmospheric pressure, and isolating the product by water leaching the soluble chlorides, wet screening to remove residual non-acicular pigmentary titanium dioxide, filtering and drying.

A preferred embodiment is a process for preparing titanium dioxide of unusual dimensional uniformity and increased acicularity comprising reaction at 960°–990° C. and atmospheric pressure of a 1.5–3.0 mm. thick layer of a mixture consisting, by weight, of 4–6 percent pigmentary rutile, 14–17 percent titanium trichloride, and 77–82 percent of an equimolar mixture of sodium chloride and potassium chloride with, in turn, oxygen containing water vapor at a partial pressure of 0.4–0.6 atmospheres, followed by dry oxygen for 5–7 and 13–15 minutes, respectively, at flow rates of 5–6 and 2.5–3.0 milliliters per minute per gram of reaction mixture, respectively, the gaseous volumes being measured at room temperature and atmospheric pressure.

DETAILS OF THE INVENTION

In this specification the terms "dry oxygen" and "unhumidified oxygen" are used interchangeably to refer to essentially dry oxygen, such as oxygen in the state of dryness in which it is normally supplied commercially in cylinders. Further drying by, for example, passage through a desiccant is usually not required.

The process of the invention is preferably carried out at atmospheric pressure though pressures somewhat below or above can be employed. Since the reaction may be effected at atmospheric pressure, provision of costly equipment capable of withstanding pressures substantially above atmospheric is unnecessary, and reaction may be effected conveniently in electrically heated tubular reactors constructed, for example, of metal or of refractory materials such as mullite, silica, porcelain and Vycor, or in chemically inert boats, e.g., of Vycor located in various types of muffle furnaces. Provision must be made to permit ingress of humidified oxygen followed by dry oxygen at controlled rate and for their egress from the apparatus. Reactors which have been exposed to air for some time, or in which the walls and cement are not dry, my result in excessive water vapor pressure and undesirable formation of irregular, dendritic, large or bladelike fibers.

Commercially available grades of titanium (III) chloride, sodium chloride, potassium chloride and pigmentary rutile may be employed as reactants. Use of high purity reactants leads to a purer product but is not essential. The R–990 grade of titanium dioxide, an approximately equiaxed pigmentary grade of rutile of about 0.2 micron particle size sold by the Du Pont Company under the code "R–990" serves conveniently as the essential $TiO_2$ additive.

Proportions in which the several reactants are employed is important. Presence of finely divided titanium dioxide in the reaction mixture is essential though the exact manner in which it functions is not completely understood. It may function as a nucleating agent, i.e., "seed," though part of it appears to survive unchanged. Whatever the mechanism by which it operates, the presence of the finely divided titanium dioxide results in improved fiber straightness and cross-sectional uniformity. Results are optimum when the charge contains about 5 percent by weight of $TiO_2$ additive. Further increase in the quantity of $TiO_2$ added results in increased fiber diameter, and when the reaction mixture contains as much as 21 percent $TiO_2$ by weight, a high proportion of 7–8 micron or larger fibers are formed.

The ratio of potassium chloride to sodium chloride in the reaction mixture is important. When potassium chloride alone is employed, the product consists primarily of undesirably coarse fibers. Addition of sodium chloride results in the formation of fibers of about 4 micron diameter in addition to some coarser fibers. The proportion of fibers approximately 4 microns in diameter is at a maximum when sodium chloride and potassium chloride are used in approximately equimolar quantities. When the NaCl:KCl molar ratio is increased from equimolar to 70:30, fiber yield is materially reduced, apparently due to lowering in rate of reaction.

Presence of controlled quantities of water in the atmosphere during the initial nucleation stage of the salt-melt synthesis of fibrous titanium dioxide is important to the attainment of fine, uniform fibers. The partial pressure of water vapor in the oxygen should be greater than 0.1 atmosphere and less than 0.76 atmosphere, preferably about 0.5 atmosphere. At water transport rates corresponding to 0.1 atmosphere or less partial pressure, relatively few approximately 4 micron diameter fibers are formed. Water vapor partial pressure substantially in excess of 0.5 atmosphere has a number of undesirable effects, e.g., formation of large voids in the melt, reduction in fiber yield by 50 percent or more, formation of irregular and dendritic fibers, and inclusion of small amounts of brookite in the product. The partial pressure of water vapor in oxygen admitted to the reaction zone is conveniently controlled by bubbling ordinary commercially available oxygen through liquid water at 57°–93° C., preferably at 83° C. in such manner as to saturate the oxygen with water vapor at the temperature in question. The humidified oxygen is then normally admitted to the reactor at the same temperature. Humidified oxygen is generally admitted to the reaction zone at flow rates of 1 to 25, preferably 5–6 milliliters per minute per gram of charge for 2 to 15 minutes, preferably 5–7 minutes.

Flow of humidified oxygen is followed by flow of ordinary, unhumidified, commercially available oxygen at a rate of 1 to 10, preferably 2–4 milliliters/minute/gram of charge for 2 to 25 minutes, preferably for 13–15 minutes.

Once nucleation has been accomplished by means of the wet oxygen, dry oxygen is admitted to bring about lengthwise fiber growth. Titanium trichloride has an appreciable vapor pressure at 890°–1,100° C. and, once volatilized, quickly oxidizes to nonfibrous titanium dioxide, i.e., undesirable "-smoking" may occur. Accordingly, the flows of wet and dry oxygen are preferably held within the specified limits to avoid "smoking" and disturbance of heat balance in the furnace. It will be appreciated that optimum rate of flow and time of exposure to wet and dry oxygen depend to some extent upon the size and shape of the furnace and the relationship of furnace geometry to the cross-sectional area of the melt. Once conversion of $TiCl_3$ to fibrous rutile has been completed, flow of dry oxygen is normally discontinued, and the reaction mixture is removed from the hot zone. Longer exposure to oxygen is unnecessarily costly and increases the possibility of lateral fiber growth by liquid transport.

Approximately 150 milliliters of oxygen/gram of $TiCl_3$ is theoretically required for complete conversion of $TiCl_3$ to $TiO_2$. Part of the required oxygen is consumed during the period in which wet oxygen is admitted and the remainder during the period in which dry oxygen is admitted. Air may be employed rather than oxygen though it is preferred to use oxygen to minimize loss of $TiCl_3$ by "smoking."

The process of this invention is carried out at 890°–1,100° C., preferably between 960°–990° C. Fiber quality and yield are not improved by use of temperatures above 1,100° C. and fibers produced at temperatures of less than 890° C. are inferior in quality. It is preferred that the furnace be at reaction temperature when the charge is introduced, otherwise premature oxidation will result in fibers of inferior quality.

A distinctive feature of this invention is the growth of fibers at the surface of the melt in a layer 0.5 to 1 millimeter thick, said fibers being oriented normal to the surface of the melt. Immediately underneath these desirably sized fibers, there is usually found a layer of larger fibers and, beneath this a salt layer containing powdered aggregates of $TiO_2$. Because of this manner of growth it is desirable that the reaction mixture be spread out over a large area and preferably be only about 1.5 to 3 mm. in depth. For small reaction charges of the order of 40 grams, this may be accomplished by carrying out the reaction in 9-inch diameter vitreous silica dishes or in 3 × 5-inch vitreous silica trays placed in a muffle furnace or in 1 × 8-inch silica trays placed in a tube furnace, In any case, the reaction mixture should occupy at least 0.5 percent of the free volume within the reaction chamber.

For a clearer understanding of the invention, the following specific example is given. This example is intended to be merely illustrative of the invention and not in limitation thereof.

EXAMPLE 1

Titanium (III) chloride in an amount of 6.2 g. was placed in a 4-inch diameter vitreous silica dish and covered with a blend of 17.8 g. of commercially available, reagent-grade potassium chloride and 13.9 g. of commercially available, reagent-grade sodium chloride. Two grams of pigmentary rutile (R 990, Du Pont Company) were sprinkled over the mixture. The dish and contents were placed in a muffle furnace (chamber size of 4.5 × 4.5 × 7 inches) preheated to 975° C. Humidified oxygen was introduced into the furnace chamber above the charge for 6 minutes, followed for the next 14 minutes by ordinary unhumidified, commercially available oxygen introduced in the same way. Oxygen flowing at 110 ml./min. (metered at room temperature) was employed for the entire 20-minute cycle, but for the first 6-minute period the oxygen was humidified to a water-vapor partial pressure of approximately 0.5 atmosphere by first bubbling it through water at 83° C. At the conclusion of the heating period, the dish was removed and allowed to cool in air at room temperature. There was some fuming during reaction, and a yellow powder that consisted principally of $TiO_2$, presumably formed by volatilization and oxidation of a little of the $TiCl_3$, collected on the furnace wall.

The solidified reaction product was removed from the dish, slurried in warm water for 30–60 minutes, to extract halides, filtered, and dried. The filter cake, which weighed 4.7 g., was slurried in 400 ml. of water, and washed back and forth on a 400-mesh screen for about 4 minutes, using 5 gallons of water. The material that passed through the screen weighed 3.9 grams; though this fraction contained some fibers, it was discarded. The material that remained on the screen was dispersed in 0.5 liter of water in an Osterizer mixer, agitated at low speed for 2 minutes, and again washed back and forth on a 400-mesh screen, using 3.5 gallons of water. The material that passed through the screen weighed 0.31 g.; this fraction, which was discarded, included small fibers and equiaxed material. The fibrous rutile that remained on the screen weighed 0.36 g. This material gave an X-ray diffraction pattern essentially identical to the pattern for rutile listed in the American Society of Testing Materials index of X-ray powder diffraction patterns.

Fibers produced in 38 runs of the type just described in which the yield ranged from 0.21 to 0.41 g. per run were combined, and a portion thereof photographed using an optical microscope. The photograph was magnified onto a large screen and 528 individual fibers were measured thereon with a millimeter scale. The data were processed on a computer.

Similarly a representative sample of a product (identified "Comparison") obtained using essentially the process of U.S. Pat. No. 3,012,857 was photomicrographed and 485 fibers were measured in the manner described above. It is apparent from the two sets of particle size data shown in Table I, that product from the present invention is more uniform, of finer diameter and greater acicularity than the "Comparison."

TABLE I

| | Present Invention | "Comparison" |
| --- | --- | --- |
| Diameter range (micrometers) | 1–14 | 6–43 |
| Average Diameter (micrometers) | 4.2 | 13 |
| Length Range (micrometers) | 15–585 | 15–660 |
| Average Length (micrometers) | 162 | 171 |
| Axial Ratio (L/W) | 4–98 | 2–58 |
| Average Axial Ratio | 43 | 14.8 |

To illustrate the advantages of the finer, more dimensionally uniform and more acicular rutile fibers prepared by the process of the present invention in applications such as reinforcing agents for polymeric resins, rutile fibers (42.3 grams) prepared in the manner described above were surface treated by wetting with 495 milliliters of benzene followed by mixing with a solution of 0.64 grams of A-1,100 silane (Union Carbide Corp.) dissolved in 25 milliliters of benzene. After recovering the fibers by filtration, they were air-dried and heated in vacuo overnight at 125° C. The treated fibers (42.5 grams) and 90 grams of nylon molding powder (Du Pont Zytel 101 nylon) were tumbled 1.5 hours in 450 milliliters of methanol, filtered, and dried in vacuo at 125° C. The composite was extruded, cut into molding chips and injection molded to give bars for tensile measurement. A sample of the "Comparison" product was similarly incorporated into nylon powder and extruded into bars. The results of tensile measurements are shown in Table II and illustrate not only the marked improvement in tensile properties conferred to polyamide resins by incorporating fibrous rutile therein, but also the superiority for such use of rutile fibers prepared by the process of the present invention.

TABLE II

Tensile Properties of Nylon Reinforced With Fibrous Rutile

| Reinforcement | Tensile Strength p.s.i. | % Elong. | Tensile Modulus p.s.i. |
|---|---|---|---|
| None | $1.0 \times 10^4$ | 40 | $3.5 \times 10^5$ |
| "Comparison" | $1.29 \times 10^4$ | 4.6 | $12.2 \times 10^5$ |
| Present Invention | $1.56 \times 10^4$ | 2.8 | $16.7 \times 10^5$ |

Similar advantages have been found for the product of this invention in reinforcing other polymeric resins. Since it is obvious that many changes and modifications can be made in the above-described details without departing from the nature and spirit of the invention, it is to be understood that the invention is not to be limited to said details except as set forth in the appended claims.

What is claimed is:
1. A process for producing rutile titanium dioxide fibers of improved fineness and acicularity and unusual dimensional uniformity comprising the consecutive steps of:
   a. Charging a quantity of mixture consisting of, by weight, 5-25 percent titanium trichloride, 92-54 percent of sodium chloride/potassium chloride in a 1:3 to 3:1 molar ratio, and 2-21 percent pigmentary rutile titanium dioxide, into an enclosed refractory chamber maintained at a temperature of 890°-1,100° C. and atmospheric pressure, said quantity of reaction mixture being disposed within said chamber such that a uniform bed depth of 1.5-3.0 millimeters in thickness of reaction mixture is maintained during reaction and being sufficient to occupy at least 0.5 percent of the free volume within said chamber,
   b. Introducing into said chamber 1 to 25 milliliters per minute per gram of reaction mixture of humidified oxygen containing 0.10-0.76 atmospheres partial pressure of water vapor, for 2 to 15 minutes,
   c. Introducing into said chamber 1 to 10 milliliters per minute per gram of reaction mixture of dry oxygen for 2 to 25 minutes, and
   d. Recovering the product by leaching the reaction mass with water, screening, filtration and drying.
2. The process of claim 1 wherein:
   In step (a) said reaction mixture comprises 14-17 percent by weight of titanium trichloride, 77-82 percent by weight of an equimolar mixture of sodium chloride and potassium chloride, and 4-6 percent by weight of pigmentary rutile titanium dioxide, and the reaction temperature is between 960°-990° C.,
   In step (b) the humidified oxygen contains 0.4-0.6 atmospheres partial pressure of water vapor and is added at a rate of 5-6 milliliters per minute per gram of reaction mixture for 5-7 minutes, and
   In step (c) dry oxygen is added at a flow rate of 2.5-3.0 milliliters per minute per gram of reaction mixture for 13-15 minutes.

* * * * *